United States Patent [19]
Tennant et al.

[11] Patent Number: 5,153,805
[45] Date of Patent: * Oct. 6, 1992

[54] TEMPERATURE-COMPENSATED THERMAL PROTECTOR

[75] Inventors: James A. Tennant, Perrysville; Charles Yagher, Jr., Lexington, both of Ohio

[73] Assignee: Thermo-O-Disc, Incorporated, Mansfield, Ohio

[*] Notice: The portion of the term of this patent subsequent to Feb. 13, 2007 has been disclaimed.

[21] Appl. No.: 394,480

[22] Filed: Aug. 16, 1989

Related U.S. Application Data

[63] Continuation-in-part of Ser. No. 202,945, Jun. 6, 1988, Pat. No. 4,901,186.

[51] Int. Cl.$^5$ .................................. H02H 9/02
[52] U.S. Cl. ......................... 361/27; 361/106
[58] Field of Search ............... 361/103, 106, 24, 27, 361/103, 106; 338/20, 21, 22 R, 23, 24, 25; 318/783, 434

[56] References Cited

U.S. PATENT DOCUMENTS

| | | | |
|---|---|---|---|
| Re. 31,367 | 8/1983 | D'Entremont | 361/27 |
| 3,673,538 | 6/1972 | Faxon | 361/103 |
| 3,916,264 | 10/1975 | Berg | 338/22 R |
| 4,422,120 | 12/1983 | Kobayashi et al. | 361/24 |
| 4,792,877 | 12/1988 | Thornton | 361/103 |
| 4,901,186 | 2/1990 | Tennant et al. | 361/106 |

*Primary Examiner*—Todd E. Deboer
*Attorney, Agent, or Firm*—Jones, Day, Reavis & Pogue

[57] ABSTRACT

A protective PTC device is heated by a heater PTC device or by a resistor to an elevated temperature greater than ambient but less than its switching temperature. The elevated temperature of the protective PTC device reduces its switching response time, and minimizes variations in such response time with variations in ambient temperature. The protective PTC device is connected in series with an electrical load to reduce current to a load when the protective PTC device is switched to its high-resistance state by a temperature increase resulting from overcurrent. The heater PTC device or the heater resistor may be in parallel or in series with the protective PTC device. The heater PTC device does not carry load current, but the heater resistor may be placed in series with the load and the protective PTC device so as to carry load current along with the protective PTC device.

10 Claims, 2 Drawing Sheets

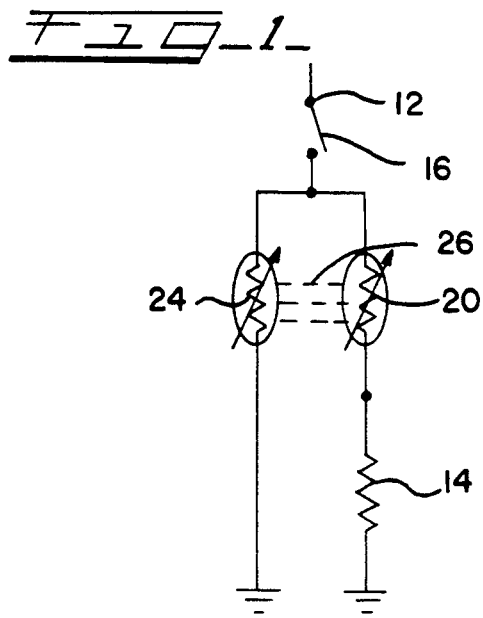
FIG-1-
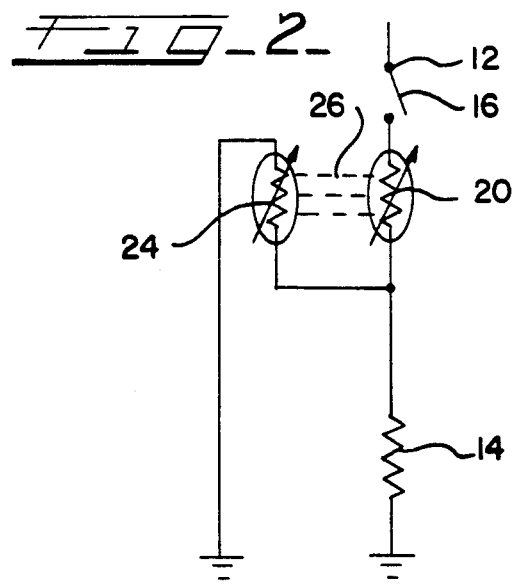
FIG-2-
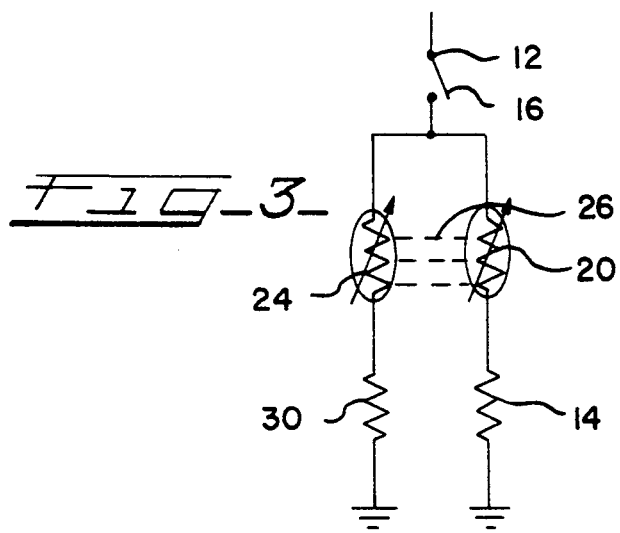
FIG-3-
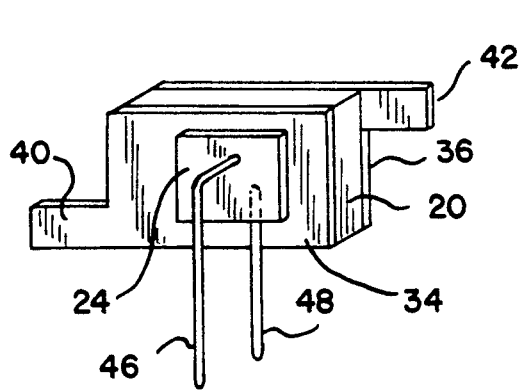
FIG-4-
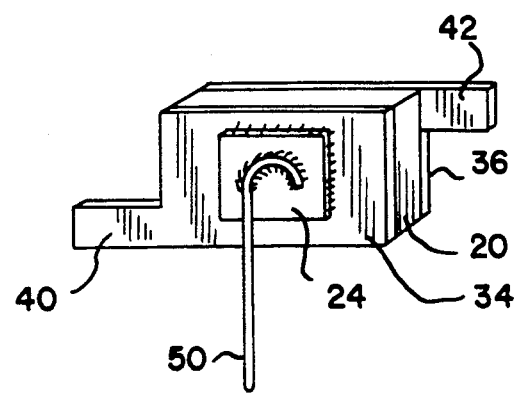
FIG-5-

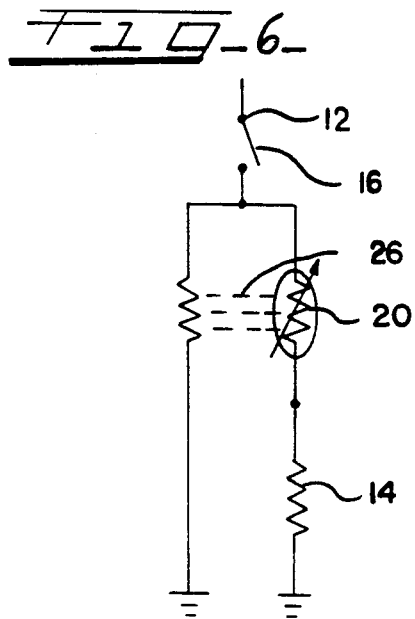
FIG-6-
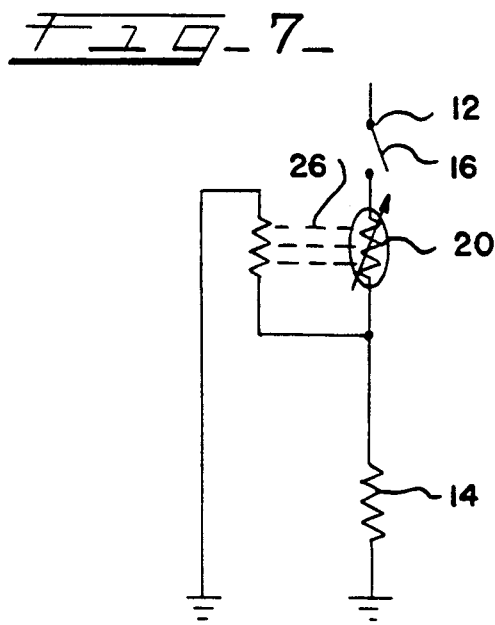
FIG-7-
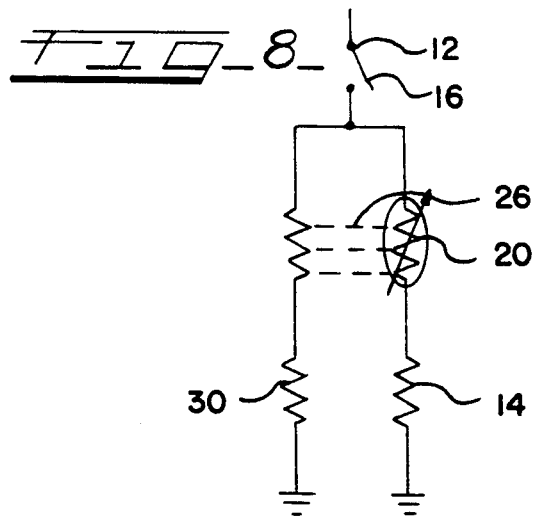
FIG-8-
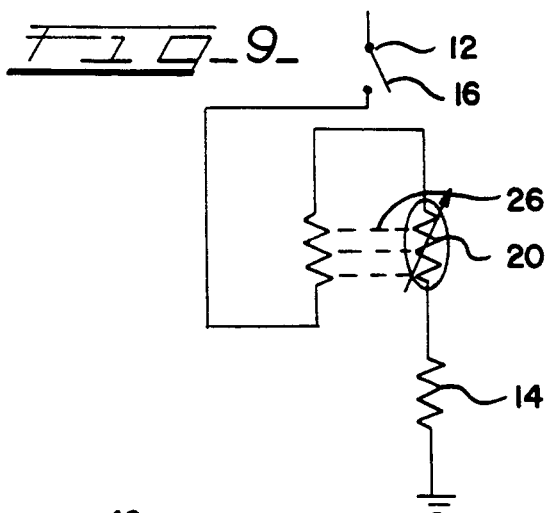
FIG-9-
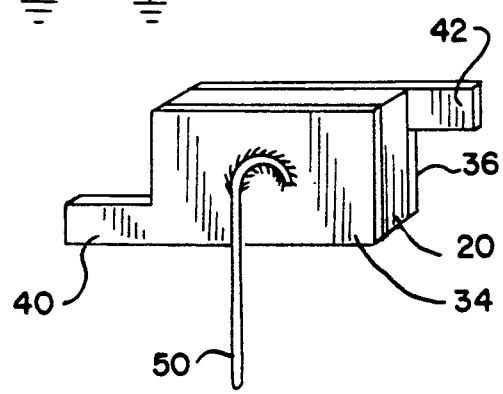
FIG-10-

TEMPERATURE-COMPENSATED THERMAL PROTECTOR

This application is a continuation in part of our co-pending application Ser. No. 07/202,945, filed June 6, 1988 now U.S. Pat. No. 4,901,186.

BACKGROUND OF THE INVENTION

This application relates to the art of thermal protectors and, more particularly, to thermal protectors of the type used for protecting a load in an electric circuit. The invention is particularly applicable to thermal protectors of the type having a positive temperature coefficient of resistance, and will be described with specific reference thereto. However, it will be appreciated that the invention has broader aspects and may find uses with thermal protectors of other types.

SUMMARY OF THE INVENTION

A thermal protector is heated to an elevated temperature greater than ambient temperature but less than its switching temperature. In the event of a circuit malfunction, the time required for the thermal protector to reach its switching temperature is substantially reduced, because the starting point is the elevated temperature instead of ambient temperature. There is also minimal variation in operating time with variations in ambient temperature.

In a preferred arrangement, the thermal protector is one having a positive temperature coefficient of resistance, commonly known as a PTC device. Heat is supplied to the protective PTC device by a heater PTC device or by a resistor. The heater PTC device has a switching temperature that is greater than ambient temperature and less than the switching temperature of the protective PTC device. If a resistor is used to heat the PTC device, its value will be chosen to heat the PTC device to a temperature above the ambient temperature but below the switching temperature of the PTC device. During normal operation of the circuit when the PTC device is used as a heater, the heater PTC device switches to its high-resistance state and supplies heat to the protective PTC device.

The protective and heater PTC devices and also the heater resistor and the protective PTC device may be connected in parallel or in series and, when connected in series, the heater PTC device or the heater resistor is in parallel with the load being protected. The heater resistor may also be placed in series with the protective PTC device and the load. When a heater PTC device is used, the initial resistance of the heater PTC device is substantially greater than the initial resistance of the protective PTC device so that the heater PTC device reaches its switching temperature shortly after the circuit is energized.

It is a principal object of the present invention to provide an improved arrangement <for reducing the response time of a thermal protector.

It is also an object of the invention to provide an arrangement for minimizing the effect of varying ambient temperature conditions on the response time of a thermal protector.

It is a further object of the invention to provide an improved thermal protector assembly that includes a protective thermal protector and a heater for same.

BRIEF DESCRIPTION OF THE DRAWINGS

FIG. 1 shows a typical circuit that includes the improved thermal protector arrangement of the present invention.

FIG. 2 shows another circuit arrangement.

FIG. 3 shows another circuit arrangement.

FIG. 4 is a perspective illustration showing a unitary assembly of a protective PTC device and a heater PTC device intended for connection in parallel.

FIG. 5 is a perspective illustration showing a unitary assembly of a protective PTC device and a heater PTC device intended for connection in series.

FIG. 6 is an alternate circuit arrangement using a heater resistor to heat a protective PTC device.

FIG. 7 is an alternate circuit arrangement for heating a protective PTC device.

FIG. 8 is an alternate circuit arrangement for heating a protective PTC device with a resistor.

FIG. 9 is an alternate circuit arrangement for heating a protective PTC device with a resistor.

FIG. 10 is a perspective view of a PTC device with an attached heater resistor.

DESCRIPTION OF PREFERRED EMBODIMENTS

FIG. 1 shows a voltage source 12 connected with a load 14 through a switch 16. Load 14 can take many forms, including an electric motor or an electric heater. A protective PTC device 20 is connected in series with voltage source 12 and load 14. In the event of a malfunction, the protective PTC device 20 reduces current flow to load 14. In arrangements of this type, the response time of the protective PTC device 20 varies substantially with variations in ambient temperature. In accordance with the present invention, the response time of protective PTC device 20 is made substantially independent of variations in ambient temperature.

The protective PTC device 20 is preferably made of a material having a positive temperature coefficient of resistance. The material can be a conductive polymer having a particulate conductive filler such as carbon black. However, the material can also take other forms, including a doped ceramic such as barium titanate. For purposes of this application, a thermal protector of the type described will be referred to as a PTC device or a PTC material. A PTC device exhibits a non-linear change in resistance with temperature. Within a certain narrow temperature range, the electrical resistance of a PTC device changes abruptly. A PTC device may be customized to respond either to temperature conditions of the surrounding environment or to current overload conditions. Also, the resistance and switching temperature of a PTC device can be varied by changing the composition of the PTC material and by changing its geometry.

In a typical application, a PTC device is connected in series with the circuit components requiring protection. In the event of an overload in the system, the PTC device will reach switching temperature either by self-induced heating ($I^2R$) from the current passing through it or by sensing excessive ambient temperatures. At this point, the PTC device switches into its high-resistance state, and effectively blocks the flow of current. A minimal amount of current will persist (trickle current), which holds the PTC device in its high-resistance state. Once the abnormal condition has been corrected, the PTC device will return to its rated conductive state, ready to protect the system once again.

In accordance with the present application, a heater PTC device 24 is positioned in heat-transfer relationship with protective PTC device 20. The switching temperature of heater PTC device 24 is greater than normal ambient temperature and less than the switching temperature of protective PTC device 20. Heater PTC device 24 also has a substantially greater initial resistance than protective PTC device 20. The resistance and switching temperatures of heater PTC device 24 are such that it switches to its high-resistance state every time the circuit is energized. When heater PTC device 24 reaches its switching temperature, a trickle current continues to flow through it to keep at its switching temperature. Heat is transferred from heater PTC device 24 to protective PTC device 20 as generally indicated by lines 26.

A typical heater PTC device 24 may have an initial resistance of a few ohms, while a protective PTC device 20 may have an initial resistance of a few milliohms. Heater PTC device 24 may have a switching temperature of around 110° C., while protective PTC device 20 may have a switching temperature of around 125°-130° C. When the circuit is energized, the power dissipation within heater PTC device 24, in accordance with $V^2/R$, causes heater PTC device 24 to reach its switching temperature and its resistance jumps sharply. A trickle current then continues to flow through it, keeping it in its high-resistance state. Heat is transferred to protective PTC device 20 for heating it to an elevated temperature substantially above the ambient temperature to which the protective PTC device would ordinarily be exposed. In the event of a malfunction, such as a motor stall or the like, protective PTC device 20 will rapidly reach its switching temperature and greatly reduce current flow to the load. In the example given, only a 15°-20° rise in temperature of protective PTC device 20 is required before the switching temperature is reached. This substantially reduces the response time of the protective PTC device as compared to arrangements where the required temperature rise is from a much lower ambient temperature than from the elevated temperature provided by the heater PTC device. In addition, the response time of the protective PTC device is also substantially more uniform and independent of varying ambient temperature conditions.

FIG. 1 shows the heater and protective PTC devices connected in parallel. In the arrangement of FIG. 2, protective and heater PTC devices 20 and 24 are connected in series, with heater PTC device 24 connected in parallel with load 14. Thus, all of the circuit current flows through protective PTC device 20. In the arrangement of FIG. 3, a limiting resistance 30 is connected in series with heater PTC device 24 where the initial current through such PTC device must be held to a value below the self-limiting current of such PTC device.

FIG. 4 shows an assembled protective PTC device and a heater PTC device. Brass plates 34 and 36 are conductively bonded to opposite faces of protective PTC device 20, and include connector terminals 40 and 42. Heater PTC device 24 is bonded to the outer surface of brass plate 34 with an insulating dielectric adhesive, and an insulating spacer is interposed between heater PTC device 24 and plate 34. Heater PTC device 24 has conductive metal foil or mesh bonded or embedded in its opposite flat faces, and connector leads 46 and 48 are attached thereto. Terminals 40 and 46 are adapted for connection to the voltage source, and terminal 42 is adapted for connection to the load. Thus, the unitary assembly of FIG. 4 may be connected as shown in FIG. 1. The thermal contact of the two PTC devices efficiently transfers heat from the heater PTC device to the protective PTC device.

FIG. 5 shows an arrangement wherein heater PTC device 24 has one of its faces conductively soldered to the outer surface of brass plate 34. A single connector lead 50 is attached to the opposite outer face of heater PTC device 24. In this arrangement, connector terminal 40 can be connected to the voltage source, while terminal 42 is connected with the load. Terminal 50 is then connected to ground of effectively connecting the two PTC devices in series, while the heater PTC device is in parallel with the load as in the circuit of FIG. 2.

FIG. 6 shows a voltage source 12 connected to a load 14 through a switch 16. As before, load 14 can take many forms, but is typically an electric motor or an electric heater. Protective PTC device 20 is connected in series between voltage source 12 and load 14 to interrupt current flow to load 14 in the event of a malfunction. The response time of protective PTC device 20 is made substantially independent of variations in ambient temperature by disposing a resistor 60 in heat-transfer relationship with protective PCT device 20. The resistor 60 is thus placed in parallel with the series combination of protective PTC device 20 and load 14. The resistance of resistor 60 is selected to transfer heat along lines 26 to protective PTC device 20 in an amount that places protective PTC device 20 near but below its switching temperature. An overload in the circuit, such as a blocked rotor of a motor as load 14, will cause the protective PTC device to switch into its high-resistance mode, protecting the load 14.

FIG. 7 is an alternate arrangement for heating a protective PTC device 20. In FIG. 7, the voltage source 12 is connected through a switch 16 and a protective PTC device to a load 14. A resistor 60 is placed in parallel with the load 14 and in thermal contact with PTC device 20 as indicated by lines 26. In FIG. 7, the protective PTC device 20 carries the current of resistor 60, so that when an overload in the load 14 causes the protective PTC device 20 to switch to its high-resistance mode, the current through the resistor 60 is also reduced. This will shorten the time that it takes to cool the protective PTC device 20 and restore power to the load 14.

FIG. 8 is an alternate arrangement in which the voltage source 12 is connected through a switch 16 and a protective PTC device to a load 14. The resistor 60 is placed in thermal contact with the protective PTC device 20 through lines 26, and a limiting resistor 30 is placed in series with the resistor 60 to provide a separate limit for the current in the resistor 60. This is a matter of design choice in the selection of values of resistance for the resistor 60 to provide a desired amount of heat to the protective PTC device 20.

FIG. 9 is an alternate circuit arrangement in which the voltage source 12 is connected through a switch 16, through the heater resistor 60, the protective PTC device 20 and the load 14. In FIG. 9, the load current also passes through the protective PTC device 20 and the heater resistor 60.

FIG. 10 is a perspective view of a PTC device with an attached heater resistor. In FIG. 10, heater PTC device 24 is heated directly by resistance wire 62 which is soldered to brass plate 34. Brass plate 36, which includes terminal 42, is connected to PTC device 20, which in turn is connected to brass plate 34. Current flow is through lead 50, resistance wire 62, brass plate 34, PTC device 20, and terminal 42 of brass plate 36. The resistance wire 62 is a high-current resistor, typically a wire resistor of nichrome or the like, when it is disposed so as to carry the motor current.

In the arrangements shown and described, the two PTC devices are switchable to their high-resistance state at a predetermined temperature range. The switching temperature range of the heater PTC device is substantially lower than the switching temperature range of the protective PTC device. The heater PTC device is switchable to its high-resistance state during normal operation of the circuit and load, while the protective PTC device is switchable to its high-resistance state only under abnormal operation of the circuit and load. The heater PTC device switches to its high-resistance state during normal operation of the circuit for maintaining the protective PTC device at an elevated temperature that is still below the temperature range at which the protective PTC device switches to its high-resistance state. With such an arrangement, the switching time of the protective PTC device is less susceptible to fluctuations in ambient temperatures.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A thermal protector for electric circuits having an electrical load comprising: a heating resistor and a protective PTC device in heat-transfer relationship with each other, the protective PTC device being switchable to a high-resistance state, the heater resistance sized and disposed to transfer heat constantly to the protective PTC device to maintain the protective PTC device at a temperature that is above ambient temperature and that is below a switching temperature of the PTC device, the protective PTC device being in series with a parallel combination of the heater resistor and the load, whereby switching time of the protective PTC device is rendered less susceptible to variations in ambient temperature.

2. The protector of claim 1 wherein said heating resistor does not have PTC characteristics.

3. A thermal protector for electric circuits having an electrical load comprising: a heating resistor and a protective PTC device in heat-transfer relationship with each other, the protective PTC device being switchable to a high-resistance state, the heater resistor sized and disposed to transfer heat constantly to the protective PTC device to maintain the protective PTC device at a temperature that is above ambient temperature and that is below a switching temperature of the PTC device, the heater resistor, the protective PTC device and the load being in series, and both the heater resistor and the protective PTC device being on the same side of the load, whereby switching time of the protective PTC device is rendered less susceptible to variations in ambient temperature.

4. The protector of claim 3 wherein said heating resistor does not have PTC characteristics.

5. A thermal protector for an electric circuit comprising: a PTC device and a heat generating resistor in heat transfer relationship with the PTC device, the PTC device being switchable to a high resistance state, the resistor constantly transferring heat to the PTC device to maintain the PTC device at an elevated temperature below its switching temperature but above ambient temperature such that its switching time is less susceptible to variations in ambient temperature, the resistor and the PTC device being connected in series, and the resistor being connected in parallel with a load protected by the PTC device.

6. The protector of claim 5 wherein said heat generating resistor does not have PTC characteristics.

7. A thermal protector circuit for protecting an electrical load comprising:
   a. a protective PTC device connected in series with the load and switchable to a high-resistance state at a predetermined temperature range,
   b. a heater resistor connected in the circuit and positioned in heat-transfer relationship with and constantly heating the protective PTC device to a temperature below the predetermined temperature but above ambient temperature in normal operation such that the protective PTC device is switched to its high-resistance state only under abnormal operation of the load, and
   c. the heater resistor being connected in series with the protective PTC device and in parallel with the load.

8. The circuit of claim 7 wherein said heater resistor does not have PTC characteristics.

9. A thermal protector circuit for protecting an electrical load comprising:
   a. a protective PTC device connected in series with the load and switchable to a high-resistance state at a predetermined temperature range,
   b. a heater resistor connected in the circuit and positioned in heat-transfer relationship with and constantly heating the protective PTC device to a temperature below the predetermined temperature but above ambient temperature in normal operation such that the protective PTC device is switched to its high-resistance state only under abnormal operation of the load,
   c. the heater resistor, the protective PTC device and the load being in series, and
   d. both the heater resistor and the protective PTC device being on the same side of the load.

10. The circuit of claim 9 wherein said heater resistor does not have PTC characteristics.

* * * * *